United States Patent [19]

Montgomery

[11] Patent Number: 4,772,176
[45] Date of Patent: Sep. 20, 1988

[54] HANDLING OF PALLETIZED GOODS IN A WAREHOUSE OR THE LIKE

[76] Inventor: Harold S. Montgomery, 2466 N. 66th St., Milwaukee, Wis. 53213

[21] Appl. No.: 75,826

[22] Filed: Jul. 20, 1987

[51] Int. Cl.$^4$ .............................................. B65G 1/10
[52] U.S. Cl. ................................... 414/786; 211/1.5; 312/201; 414/331; 414/676; 198/465.2
[58] Field of Search ............ 414/233, 234, 236, 237, 414/239, 240, 241, 261, 264, 266, 267, 286, 331, 676, 786, 787; 198/465.2; 211/1.5; 312/201, 249, 250

[56] References Cited

U.S. PATENT DOCUMENTS

| | | | |
|---|---|---|---|
| 602,395 | 4/1898 | Emerson | 414/286 |
| 664,260 | 12/1900 | Gaunt | 414/241 X |
| 3,094,223 | 6/1963 | Smith . | |
| 3,235,099 | 2/1966 | Watters . | |
| 3,273,727 | 9/1966 | Rogers et al. | 180/125 X |
| 3,413,041 | 11/1968 | Moorman . | |
| 3,452,883 | 7/1969 | Watters . | |
| 3,628,673 | 12/1971 | Lynn . | |
| 3,648,852 | 3/1972 | Willuweit . | |
| 3,662,905 | 5/1972 | Mizuno et al. | 414/237 |
| 3,687,312 | 8/1972 | Weir . | |
| 3,727,984 | 4/1973 | Beck . | |
| 3,731,824 | 5/1973 | Howlett . | |
| 3,734,231 | 5/1973 | De Vries . | |
| 3,791,535 | 2/1974 | Baker et al. . | |
| 3,820,467 | 6/1974 | Burdick . | |
| 3,860,130 | 1/1975 | Frangos | 414/237 |
| 4,470,742 | 9/1984 | Schindler | 414/286 |
| 4,609,002 | 9/1986 | Noh et al. | 414/616 X |

FOREIGN PATENT DOCUMENTS

| | | | |
|---|---|---|---|
| 195063 | 1/1958 | Austria | 312/201 |
| 1810496 | 7/1969 | Fed. Rep. of Germany | 414/266 |

OTHER PUBLICATIONS

Richards-Wilcox, "Maxicube Mobile Carriage Systems", Catalog A-710-1186-30, 1986.
Richards-Wilcox, "Auto-Stak Mini-Load Crane", Catalog A-720-1186-30, 1986.
Richards-Wilcox, "Fast-Stak Warehouse Cranes", Catalog A-740-1186-30, 1986.
Richards-Wilcox, "Quik-Trieve Vertical Carousel", Catalog A-730-1186-30, 1986.
Richards-Wilcox, "Quik-Trieve Horizontal Carousels", Catalog A-570-R4-1286-30, 1986.
Richards-Wilcox, "Stor-Loc Modular Drawer System", Catalog A-700, 1986.
"Sailrail Air Film Pallet Flow", Distributed by Chavez-Flamme Co., Inc., Milwaukee, Wis.
Richards-Wilcox, "Quik-Trieve Carousels", Catalog A-570-R3-686-30, 1986.
Richards-Wilcox, "Storage & Retrieval Carousels", Catalog A-570-R2-285-30, 1985.
Richards-Wilcox, "The Organizer", No. F-501-R-2-483, 1982.

*Primary Examiner*—Leslie J. Paperner
*Attorney, Agent, or Firm*—Andrus, Sceales, Starke & Sawall

[57] ABSTRACT

A warehouse contains a fixed number of pallet-carrying primary modules (7) arranged in a rectangular block (8) and further arranged in side-by-side parallel longitudinal rows. A working row (A) provides an exposed front side (9) adjacent a worker's station (12, 13) with at least one storage row (B) disposed behind the working row and forming a single working aisle (18) if desired. A secondary module (S) is disposed externally of the block. The secondary module (S) is positioned at the upstream end of the working row and pushes the entire row downstream, causing the secondary module to join the block and the downstream primary module (45) to exit the block. The newly exited module is then moved transversely to the downstream end of a storage row, and the entire row pushed upstream, causing the exited module (45) to again join the block and the upstream primary module (46) in that row to exit the block. The latter module is utilized to repeat the previous procedure, with modules entering and exiting the block in a flow pattern such that, over time, all modules enter the working row and pass the worker's station.

6 Claims, 3 Drawing Sheets

HANDLING OF PALLETIZED GOODS IN A WAREHOUSE OR THE LIKE

BACKGROUND AND SUMMARY OF THE INVENTION

This invention relates to the handling of palletized goods in a warehouse or the like, and more particularly to handling and transfer of a plurality of pallet-carrying modules from place-to-place in association with a basic block of modules.

Numerous systems have been devised for the transfer of goods, such as groceries, in a storage warehouse. The goods are normally stored on pallet racks which are positioned in some sort of arrangement for access thereto so that the goods may be removed for placing an order. See, for example, the systems disclosed in U.S. Pat. Nos. 3,687,312, 3,731,824 and 4,470,742. Reference is also made to the systems marketed under the trademarks MAXICUBE, AUTO-STAK, FAST-STAK, QUIK-TRIEVE and others by Richards-Wilcox of Aurora, Ill.

Many of the known systems are exceedingly complex, take up a great amount of floor space, and require a substantial amount of labor. For example, many such systems involve pallet racks which are arranged in rows with numerous aisles therebetween, and require workers to circulate through the aisles and come to the particular fixed pallets for retrieving and accumulating the desired goods, either manually or by means of vertically movable cranes on which the workers sometimes ride.

In addition, modularized pallet racks and the like are often extremely heavy and numerous devices have been devised for easily moving them from place-to-place. See, for example, the devices disclosed in U.S. Pat. Nos. 3,413,041, 3,734,231 and 3,820,467.

It is an object of the present invention to improve the handling and transfer of palletized goods in a warehouse or the like in a manner which is relatively simple as well as space and labor saving. It is a further object to provide a system wherein the goods are brought to the worker, rather than the reverse. An additional object is to utilize a transferring arrangement which substantially overcomes the weight difficulties involved with palletized goods.

In accordance with the various aspects of the invention, a storage warehouse or the like is provided with a plurality of modules of palletized goods of one or more tiers. Each module includes a plurality of pallet racks arranged in longitudinally extending dual rows of a desired length. In turn, the modules themselves are arranged in side-by-side parallel rows forming a block of primary modules of a fixed number, with the block having an exposed side having an order picking station and a stocking station for workers. In the embodiment shown therein, a single aisle behind the exposed block side accommodates second order picking and stocking stations. The row of modules along the block's exposed side forms a working row, while the module row or rows behind the row containing the exposed side form storage rows.

The modules are circulated from the storage rows to the working row, and then back again to storage. Movement of the modules is enhanced by an acceleration-deceleration system and a floor air bearing system. Module transfer is accomplished by a pair of opposed computer controlled motorized transfer devices disposed at opposite ends of the block, in conjunction with one or more secondary modules in addition to the fixed number of primary modules forming the block.

A method aspect of the invention contemplates positioning a secondary module at the upstream end of the working row and pushing the entire row downstream, causing the secondary module to join the block and the downstream primary module to exit the block. The newly exited module is then moved transversely to the downstream end of a storage row, and the entire row pushed upstream, causing the exited module to again join the block and the upstream primary module in that row to exit the block. The latter module is utilized to repeat the previous procedure, with modules entering and exiting the block in a flow pattern such that, over time, all modules may enter the working row and pass the order picking and stocking stations.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
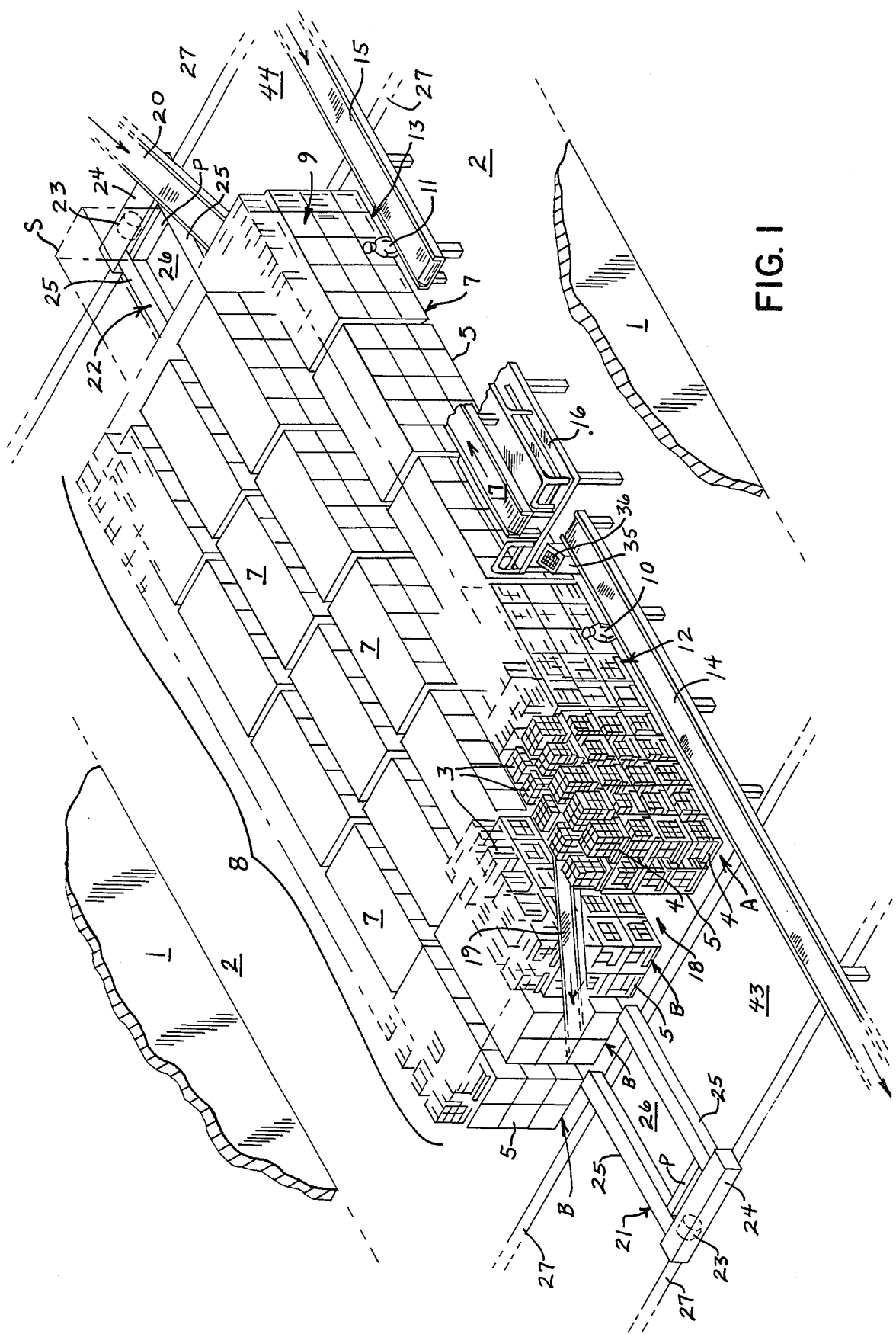
FIG. 1 is a generally schematic perspective view, taken from above, of a block of palletized modules disposed in a warehouse or the like and arranged in accordance with the aspects of the invention.

Referring to FIG. 1 of the drawings, there is illustrated a space within a storage warehouse having walls 1 and a floor 2. The warehouse is intended for storage of grocery items or other goods 3 received from a supplier, and for subsequent shipment to a purchaser, such as a supermarket. The goods 3 are adapted to be stored in groups on pallets 4, a plurality of which are mounted in pallet racks 5. As shown, each pallet rack 5 is four tiers high and contains a pair of front and rear rows of vertical pallet columns. In turn, a series of pallet racks 5 and the lower tier of pallets 4 are mounted on a support or base plate 6 (See FIG. 2.) in this instance in a series of five, to form a plurality of modules 7. As shown, each module is supported by its own individual base plate and contains a four-tiered group of pallets which are two deep and five long. Furthermore, modules 7 are arranged in a longitudinally extending rectangular block 8, with the block containing four side-by-side parallel longitudinal coextensive rows of five modules each, the number of modules in the block being fixed. In the initial arrangement shown in FIG. 1, modules 7 within block 8 are referred to as primary modules.

Block 8 has an exposed front face or side 9 for access by workers 10 and 11 who are disposed at an order picking station 12 and a downstream spaced stocking station 13, respectively. The longitudinal row of modules 7 adjacent the block's exposed side forms a working row A, while the rows behind row A form storage rows B. Worker 10 stands at order picking station 12 and manually or otherwise removes desired goods 3 from one or more tiers of an adjacent module in the upstream portion of working row A and places them on a conveyer 14 for subsequent transfer to a shipping area. Likewise, worker 11 stands at stocking station 13 and manually or otherwise removes goods 3 from an incoming conveyor 15 communicating with a receiving area and inserts them into empty spaces in one or more tiers of an adjacent module 7 of the downstream portion of working row A.

In some instances it may be desired to have additional workers working on the upper tiers of high modules, in which case additional platforms and conveyors, such as at 16 and 17 for example, may be provided.

All of the longitudinal module rows may be positioned closely to each other, with no aisles therebetween, thus conserving space. However, in the present embodiment, working row A is spaced forwardly of the remaining group of rows B to provide a single working aisle 18 directly behind row A. In this instance, workers (not shown) corresponding to workers 10 and 11 may be positioned in aisle 18 and provided with outgoing and incoming conveyors 19 and 20, respectively, these latter conveyors being shown as suitably inclined. Double side access to row A is thus achieved for processing goods thereon.

It is contemplated that each individual primary module 7 will ultimately be transferred from wherever it is in block 8 to working row A, where it may be acted on by a worker at front side 9 and, if desired, in aisle 18; and finally be transferred back to a storage row B. For this purpose, a pair of opposed upstream and downstream transfer devices 21 and 22 respectively are disposed at each end of block 8. Devices 21 and 22 are provided with motive means, such as motors 23, and are generally U-shaped with an end abutment member 24 which joins two transversely spaced longitudinally extending legs 25, thus forming a pocket 26 for receiving a module 7 therein. A pusher member P extends between legs 25 and is adapted to move therealong, for purposes to be described. Transfer devices 21 and 22 are adapted to be suitably driven transversely along tracks 27 in warehouse floor 2.

Figure 2:
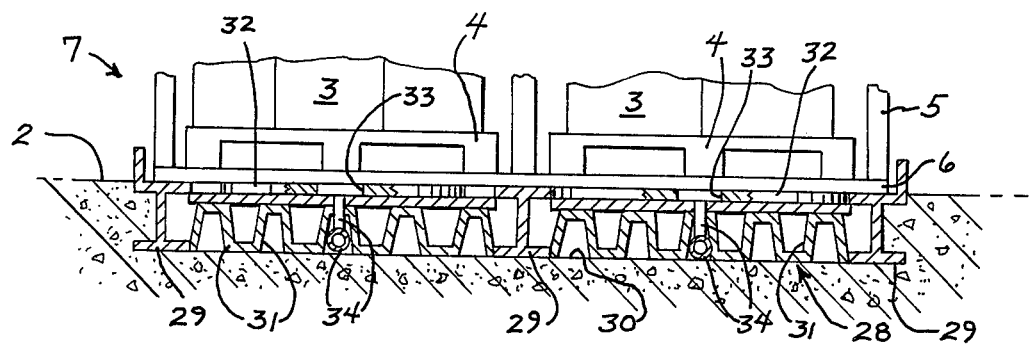
FIG. 2 is an enlarged transverse generally schematic sectional view of a floor air bearing system for transport of the modules.

To provide maximum transportability of modules 7, and minimum friction between all of the modules and floor 2, air bearing means which create a fluid film are provided in the floor which cooperate with base plate 6 of each module 7 to selectively lift the modules from the floor for floating movement thereover. FIG. 2 rather schematically illustrates such an air bearing device 28. Device 28 is adapted to be incorporated in the floor beneath the entire block 8, and in the area beneath the transverse tracks described above. A plurality of supporting I-beams 29 are mounted into floor 2 to provide a substantial recess 30 therein. Recess 30 contains a plurality of struts 31 which form a corrugated support for a plurality of large circular discs 32 having central openings 33. A source of high pressure and velocity air (not shown) is connected through a series of conduits 34 which pass upwardly through selected struts 30 and discharge air through openings 33, so that the air engages and lifts base plate 6 from contact with floor 2. The resultant floating and freedom of contact between the plate and floor permits movement of very heavy modules or groups of modules over the floor with minimal power required. Other known air bearing devices, such as those mentioned in the aforesaid patents, may alternately be used.

Turning now to the more specific concept of module transfer, transfer devices 21 and 22 are adapted to operate in conjunction not only with the fixed number of modules 7 of block 8, but also with at least one (and possibly more) additional module outside the block, such as that shown at the downstream end of block 8 in FIG. 1 and designated as secondary module S. Module S may contain the same pallet racks, pallets and goods as primary modules 7.

Figure 3:
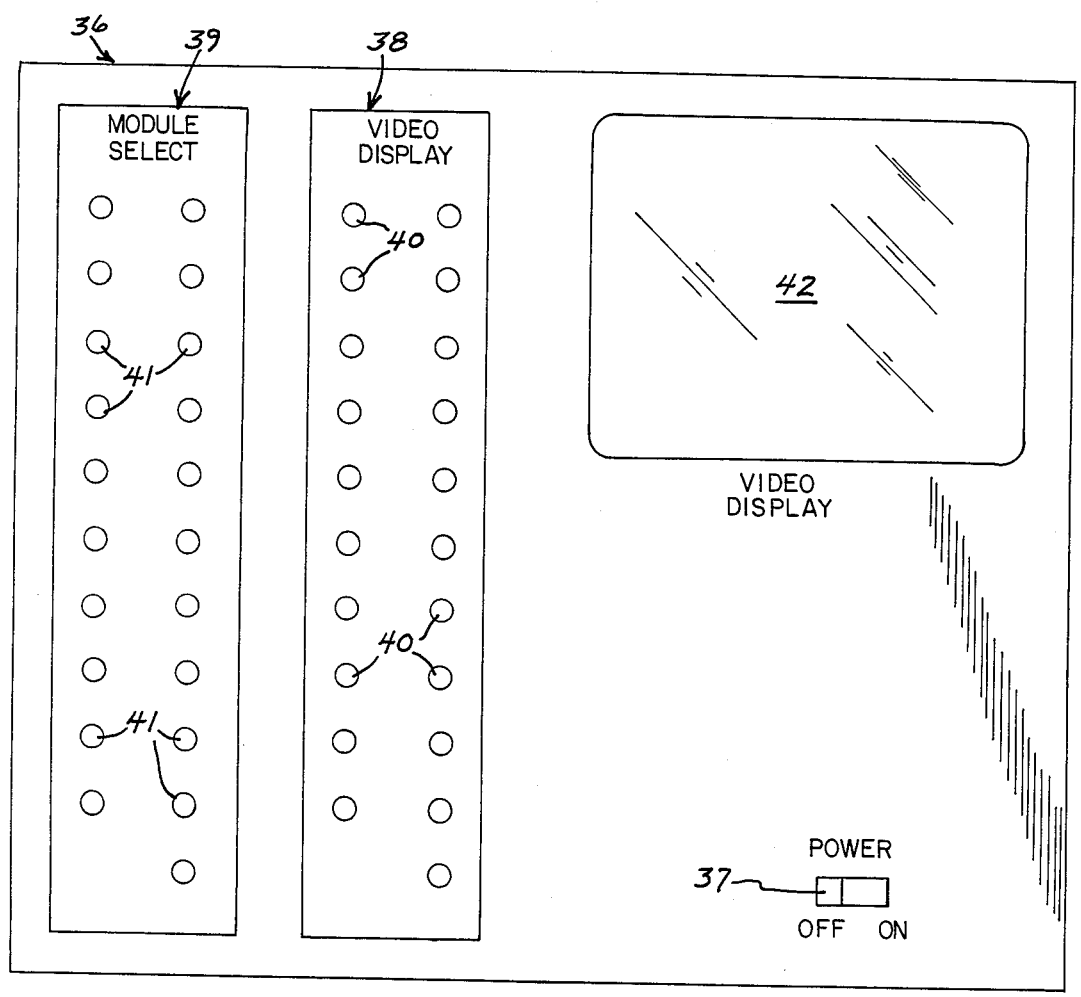
FIG. 3 is a view of one control panel for the system.

Furthermore, a programmable computer 35 of any well-known type may be connected to the motive means for transfer devices 21, 22 as well as air bearing device 28 for module transfer in accordance with the inventive aspects. FIG. 3 illustrates a form of usable computer control panel 36 to which the computer is connected. The panel is placed near a worker assigned to a station, as in FIG. 1. It is assumed that computer 35 can be programmed to keep track of the contents and position of any given module, and can cause the module to be moved in accordance with the inventive aspects. Control panel 36 is provided with a manual power switch 37, a "Video Display" section 38 and a "Module Select" section 39. Both sections 38 and 39 are provided with a set of buttons 40, 41 which correspond in number to the number of modules 7 in block 8, plus the initially external secondary module S. Buttons 40 and 41 are marked to identify a given specific module.

Under the control of the computer program, when the "Video Display" section 38 is on, the worker may call up on the screen 42 any information related to a specific module, such as contents, position, etc. by pushing the related button 40. Furthermore, and under the control of the computer program, the worker may push a desired button 41 in the "Module Select" section 39, and cause the corresponding module to be brought to him in accordance with the specific method and flow pattern to be described.

The aspects of the invention contemplate that all of the modules can ultimately be brought to worker 10 at order picking station 12, by positioning them in working row A. The track area immediately upstream of row A comprises a working row input station 43, while the track area immediately downstream of row A comprises a working row output station 44.

The unique method of circulating the modules is best illustrated in FIGS. 4 through 9.

Figure 4:
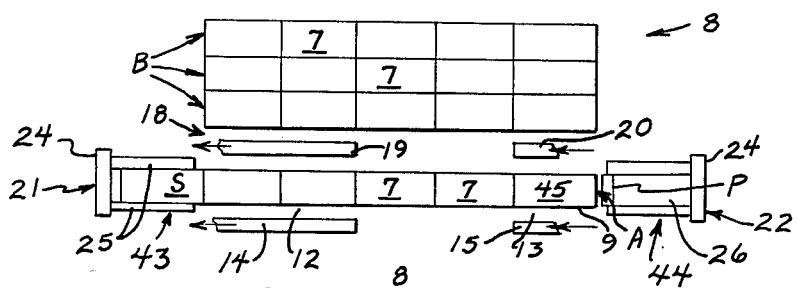
FIGS. 4-9 are schematic representations of the method of sequentially circulating the modules throughout the block.
Figure 5:
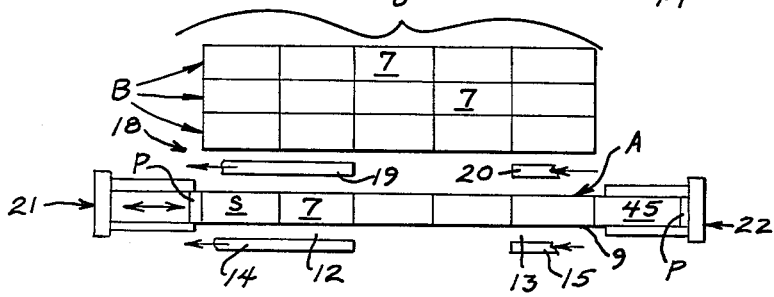

Referring to FIG. 4, secondary module S is received within the pocket 26 of upstream transfer device 21, which is initially positioned at input station 43 at the upstream end of working row A. Empty downstream device 22 is initially positioned at output station 44 at the downstream end of working row A. Under the computer control, or in any other desired manner, pusher P of upstream transfer device 21 is actuated to move in a direction longitudinally downstream of block 8, thereby pushing secondary module S against working row A and hence into block 8 so that module S joins the block. As working row A shifts in a downstream direction, the original primary module 45 at the downstream end of row A is forced longitudinally downstream against the opposite pusher P which acts as a receiver, and hence into pocket 26 of transfer device 22. Thus, module 45 exits block 8 and, in effect, becomes a new secondary module. See the results of this working row shifting procedure in FIG. 5. Module S is now positioned at order picking station 12 for worker 10 to process.

Figure 6:
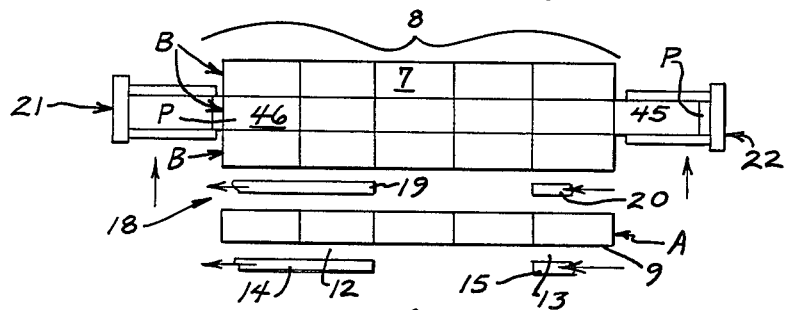
Figure 7:
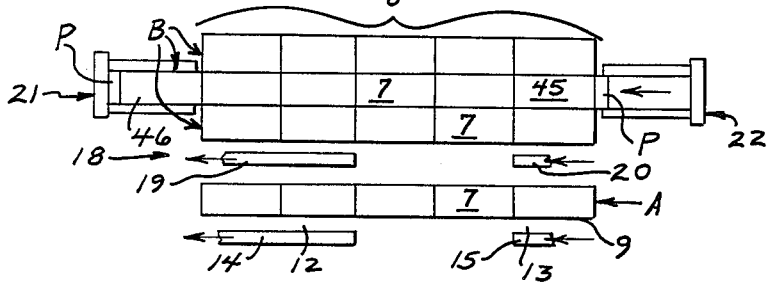
Figure 8:
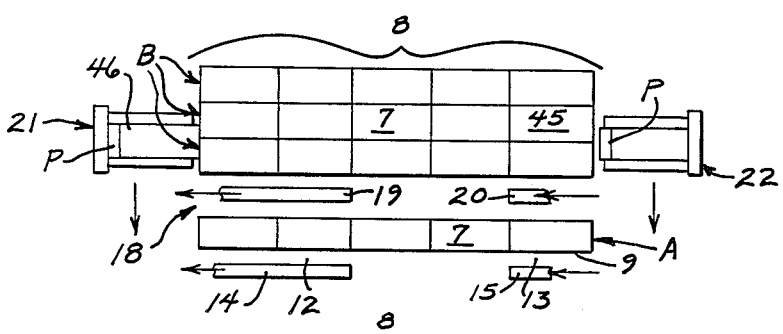
Figure 9:
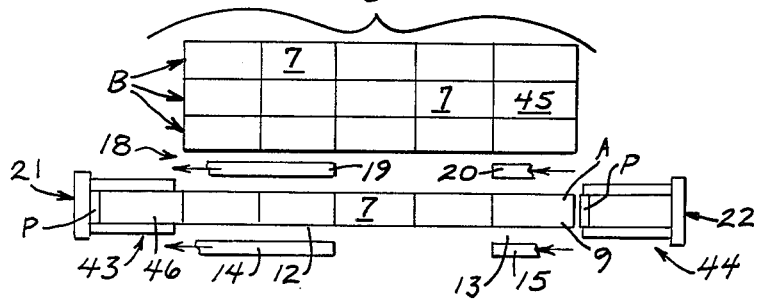

Downstream transfer device 22, with module 45 therein, is then shifted transversely rearwardly along the block end until it is disposed adjacent one of the storage rows B—in this case, the middle one as shown in FIG. 6. At the same time, empty upstream transfer device 21 is shifted transversely to a position opposite device 22 at the opposite end of the same row B. Pusher P of downstream transfer device 22 is then actuated to push module 45 against row B to cause the entire middle row B to move upstream against the opposite pusher P which acts as a receiver, thus causing module 45 to join block 8, and the original primary module 46 at the upstream end of middle row B to exit the block and in effect become a further new secondary module. See FIG. 7.

Upstream and downstream transfer devices 21 and 22 are then actuated to move forwardly and transversely of block 8 (See FIG. 8) back to working row A (See FIG. 9), where they assume the initial positions shown in FIG. 4. In this instance, however, the now secondary module 46 has replaced the original secondary module S within device 21. Device 22 is again empty.

The procedure beginning with FIG. 4 may then be subsequently repeated, with transfer devices 21 and 22 reversing roles and with their respective pushers P alternately functioning as module pushers and receivers. Modules enter and exit block 8 in a circulating flow pattern such that, over a period of time, all modules are indexed to enter working row A and—in a step-by-step manner—are positioned at stations 12 and 13.

As goods 3 are removed by a worker from a module at order picking station 12, the module is left with empty spaces. These spaces may be refilled by a worker when that module eventually reaches stocking station 13.

The extremely high mass of the modules is such that inertial forces come into play during multi-module transfer. It is therefor contemplated that the opposed pushers P of motorized transfer devices 21 and 22 be controlled via the computer program during row shifting to accelerate the module row during the first part of a shift cycle, and to decelerate the row during the latter cycle portion.

The various aspects of the invention provide a unique system for retrieving and storing goods in a warehouse, with maximum space and labor efficiency.

Various modes of carrying out the invention are contemplated as being within the scope of the following claims particularly pointing out and distinctly claiming the subject matter which is regarded as the invention.

I claim:

1. A method of handling palletized goods in a warehouse or the like, comprising the steps of:
    (a) providing a fixed number of pallet-carrying primary modules (7) arranged in a generally rectangular block (8) and further arranged in side-by-side parallel longitudinal rows; with a working row (A) providing an exposed front side (9) adjacent a worker's station (12, 13) and with at least one storage row (B) disposed behind said working row,
    (b) providing a secondary module (S) externally of said block,
    (c) positioning said secondary module at an input station (43) adjacent an upstream end of said working row (A),
    (d) pushing said secondary module longitudinally against said working row to move the latter downstream so that said secondary module enters said block (8) and effectively becomes a primary module adjacent a said worker's station (12), and so that a module (45) at a downstream end of said working row (A) exits said block and effectively becomes a new secondary module positioned at an output station (44),
    (e) moving said new secondary module (45) transversely of said block (8) and into position adjacent a downstream end of a said storage row (B),
    (f) pushing said new secondary module (45) against said last-named storage row (B) to move the latter upstream so that said new secondary module enters said block (8) and effectively becomes a primary module and so that a module (46) at an upstream end of said last named storage row (B) exits said block and effectively becomes a further new secondary module,
    (g) and moving said further new secondary module (46) transversely of said block (8) and into position at said input station (43) adjacent said upstream end of said working row (A).

2. The method of claim 1 which includes the step of subsequently repeating the steps (d) through (g) to circulate said primary and secondary modules through said block (8).

3. The method of claim 1 which includes the step of circulating all of said primary and secondary modules through said working row (A) and past said worker's station (12, 13) by continuously repeating the steps (d) through (g) in a step-by-step manner.

4. The method of claim 3 which includes the steps of:
    (a) providing only a single working aisle (18) in said block (8) and with said aisle being disposed between said working row (A) and an adjacent storage row (B),
    (b) and processing palletized goods on the modules of said working row (A) from said exposed front side (9) of said working row and from said aisle.

5. The method of claim 1 which includes the step of floating said primary and secondary modules on a fluid film adjacent a warehouse floor during said positioning, pushing and moving steps (c)-(g).

6. The method of claim 1 which includes the steps of:
    (a) accelerating the respective modules during the first portion of said pushing steps (d) and (f),
    (b) and decelerating the respective modules during the last portion of said pushing steps (d) and (f).

* * * * *